(12) United States Patent
Chen

(10) Patent No.: US 11,859,070 B1
(45) Date of Patent: Jan. 2, 2024

(54) METHOD FOR PREPARING TEA-BASED COMPOSITE BOARD AND APPLICATION THEREOF

(71) Applicant: ZENCE OBJECT TECHNOLOGY (SHENZHEN) CO., LTD., Shenzhen (CN)

(72) Inventor: Pengji Chen, Shenzhen (CN)

(*) Notice: Subject to any disclaimer, the term of this patent is extended or adjusted under 35 U.S.C. 154(b) by 0 days.

(21) Appl. No.: 18/196,401

(22) Filed: May 11, 2023

(30) Foreign Application Priority Data

Jul. 14, 2022 (CN) .......................... 202210823395.X

(51) Int. Cl.
*C08L 1/02* (2006.01)
(52) U.S. Cl.
CPC ........... *C08L 1/02* (2013.01); *C08L 2205/035* (2013.01)
(58) Field of Classification Search
CPC ........................................................ C08L 1/02
USPC ............................................................ 524/13
See application file for complete search history.

(56) References Cited

FOREIGN PATENT DOCUMENTS

| CN | 106589140 A | | 4/2017 | |
|----|----|----|----|----|
| CN | 106883632 A | * | 6/2017 | .............. C08L 99/00 |

* cited by examiner

*Primary Examiner* — Deve V Hall
(74) *Attorney, Agent, or Firm* — Che-Yang Chen; Law Office of Michael Chen

(57) ABSTRACT

A method for preparing tea-based composite board includes steps of: weighing raw materials as below: 60-70 parts of waste tea residues, 20-50 parts of tea stems, 12-30 parts of straw powder, 10-30 parts of tea pectin cellulose, 30-40 parts of coffee residues, 2-5 parts of a compatibilizer, 0.2-1.5 parts of a lubricant, 2-3 parts of a colorant, 0.1-3 parts of an antioxidant, and 0.1-3 parts of a stabilizer; soaking the tea stems in water at 60-80° C., performing through cleaning, drying in the air, and grinding to obtain tea powder with a mesh size of 10-20 meshes; mixing the waste tea residues, the tea powder, the straw powder, the tea pectin cellulose, the coffee residues, the compatibilizer, and the lubricant at 120-150° C. for 20-30 minutes; and lowering the temperature to 50-60° C., further adding and mixing colorant, antioxidant and stabilizer, and performing hydro-molding at 50-118° C. to obtain the tea-based composite board.

8 Claims, No Drawings

METHOD FOR PREPARING TEA-BASED COMPOSITE BOARD AND APPLICATION THEREOF

FIELD OF THE INVENTION

The invention relates to the technical field of building boards, in particular to a preparation method of a tea-based composite board and its applications.

BACKGROUND OF THE INVENTION

China is a major producer of tea leaves, ranking first in the world in terms of total output, planting area and output value. With the booming new tea drinking industry, the amount of tea leaf waste generated each year has reached an astonishing amount of tens of millions of tons. According to statistics, tea stem waste generated from the production and processing process of tea leaves accounts for over 20% of the total tea leaves annually. These tea residues are often disposed of, rotted or burned, leading to not only waste, but also environmental pollution and greenhouse gas emissions. Currently, tea residues are mainly recycled for fertilizers or feeds. With the increasing sales of tea beverages, the quantity of the tea residues has also grown. In addition, with the growing popularity of coffee among Chinese people, the production of the coffee residues cannot be overlooked. Therefore, the development and reuse of agricultural and food waste such as discarded tea stems, defective products of tea leaves, and coffee residues have become an urgent issue to be solved.

SUMMARY OF THE INVENTION

In response to the problems existing in the prior art, the invention provides a preparation method of a tea-based composite board and its applications. A tea-based composite, composed of agricultural and food waste such as tea leaf fiber, tea residues and coffee residues, has the advantages of biodegradability, high mechanical strength, and excellent adsorption. The invention adopts the technical solution:

In the first aspect, the invention provides a method for preparing a tea-based composite board, which comprises the following steps:

Step 1: Weighing the raw materials in the following proportions: 60-70 parts of waste tea residues, 20-50 parts of tea stems, 12-30 parts of straw powder, 10-30 parts of tea pectin cellulose, 30-40 parts of coffee residues, 2-5 parts of a compatibilizer, 0.2-1.5 parts of a lubricant, 2-3 parts of a colorant, 0.1-3 parts of an antioxidant, and 0.1-3 parts of a stabilizer;

Step 2: Soaking the tea stems in water at 60-80° C., performing through cleaning, drying in the air, and grinding to obtain tea powder with a mesh size of 10-20 meshes;

Step 3: Mixing the waste tea residues, the tea powder, the straw powder, the tea pectin cellulose, the coffee residues, the compatibilizer, and the lubricant at 120-150° C. for 20-30 min;

Step 4: Lowering the temperature to 50-60° C., further adding the colorant, the antioxidant and the stabilizer, performing uniform mixing, and performing hydro-molding at 50-118° C. to obtain the tea-based composite board.

Further, the raw material components are replaced by: 40-50 parts of waste tea residues, 20-50 parts of tea stems, 12-30 parts of straw powder, 10-30 parts of tea pectin cellulose, 30-40 parts of coffee residues, 2-5 parts of a compatibilizer, 0.2-1.5 parts of a lubricant, 2-3 parts of a colorant, 0.1-3 parts of an antioxidant, 0.1-3 parts of a stabilizer, and 15-30 parts of reinforced resin glass fiber powder.

Further, when raw materials comprise the reinforced resin glass fiber powder, Step 3 involves the mixing of the waste tea residues, the tea powder, the straw powder, the tea pectin cellulose, the coffee residues, the reinforced resin glass fiber powder, the compatibilizer, and the lubricant at 120-150° C. for 20-30 min.

Further, the raw material components are replaced by 30-40 parts of waste tea residues, 20-50 parts of tea stems, 12-30 parts of straw powder, 10-30 parts of tea pectin cellulose, 30-40 parts of coffee residues, 2-5 parts of a compatibilizer, 0.2-1.5 parts of a lubricant, 2-3 parts of a colorant, 0.1-3 parts of an antioxidant, 0.1-3 parts of a stabilizer, and 30-40 parts of industrial wood powder.

Further, when raw materials comprise the reinforced resin glass fiber powder, Step 3 involves the mixing of the waste tea residues, the tea powder, the straw powder, the tea pectin cellulose, the coffee residues, the industrial wood powder, the compatibilizer, and the lubricant at 120-150° C. for 20-30 min.

Further, the raw material components are replaced by: 30-40 parts of waste tea residues, 20-50 parts of tea stems, 12-30 parts of straw powder, 10-30 parts of tea pectin cellulose, 30-40 parts of coffee residues, 2-5 parts of a compatibilizer, 0.2-1.5 parts of a lubricant, 2-3 parts of a colorant, 0.1-3 parts of an antioxidant, 0.1-3 parts of a stabilizer, 20-30 parts of the industrial wood powder, and 15-20 parts of reinforced resin glass fiber powder.

Further, when raw materials comprise the reinforced resin glass fiber powder, Step 3 involves the mixing of the waste tea residues, the tea powder, the straw powder, the tea pectin cellulose, the coffee residues, the reinforced resin glass fiber powder, the industrial wood powder, the compatibilizer, and the lubricant at 120-150° C. for 20-30 min.

Further, a method for preparing the tea pectin cellulose comprises the steps of: drying and sterilizing on at least one of the tea stems, tea leaves, and the tea residues, crushing and grinding into powder, cooking at 60-80° C., squeezing; water extracting to obtain the tea pectin cellulose, filtering, and drying.

Further, the water content of the coffee residues is not higher than 10%.

Additionally, hydraulic molding may be replaced by hot molding, if desired.

In the second aspect, the invention provides a tea-based composite board made by the method.

Further, the tea-based composite board has a compressive strength of not less than 400 MPa, a bacteriostatic duration of not less than 8 hours, and a folding resistance of not less than 1900 times.

In the third aspect, the invention provides an application of the tea-based composite board to environmental-friendly furniture products, such as indoor furniture, kitchen and bathroom plate products, doors, floors, and the like.

Compared with the prior art, the preparation method has the advantages that it can effectively solve the problems of serious waste and excessive waste materials in the current tea industry in China, and fully utilize the coffee powder in the food waste materials. The tea-based composite board is simple to prepare, with mild conditions, and has the advantages of biodegradability, bacteriostasis, hygroscopicity, high strength and low cost. Moreover, it has the characteristics of tea leaf fiber adsorption and odor release, and can be fully biodegradable. Furthermore, the tea-based composite board can serve as a viable substitute for the superior wood in the contemporary market. It is characterized by multiple edges and arbitrary shapes, and can be used in conjunction with a variety of extension building materials, thus offering diversified and far-reaching application possibilities.

DETAILED DESCRIPTION OF THE EMBODIMENTS

In the description of the invention, it should be noted that, unless otherwise specified in the embodiments, conventional conditions or conditions recommended by the manufacturer shall be adopted. Reagents or instruments employed are of conventional type and can be procured from the market.

The present invention is further described in detail below in combination with embodiments, to help those skilled in the art have a more complete, accurate, and in-depth understanding of the inventive concept and the technical solution of the invention. The scope of protection of the invention includes, but is not limited to, the following embodiments. Any modifications made to the details and form of the technical solution of the invention, without departing from the spirit and scope of the application, fall within the scope of protection of the invention.

In the embodiments, a method for preparing the tea pectin cellulose comprises the steps of drying and sterilizing on at least one of the tea stems, tea leaves, and the tea residues, crushing and grinding into powder, cooking at 70° C., squeezing; water extracting to obtain the tea pectin cellulose, filtering, and drying.

Embodiment 1

The embodiment provides a method for preparing a tea-based composite board, wherein the method comprises the steps of:

Step 1: Weighing the raw materials in the following proportions: 60 parts of waste tea residues, 35 parts of tea stems, 20 parts of straw powder, 20 parts of tea pectin cellulose, 40 parts of coffee residues, 3 parts of a compatibilizer, 1.5 parts of a lubricant, 2 parts of a colorant, 1 part of an antioxidant, and 1 part of stabilizer, wherein the water content of the coffee residues is not higher than 10%;

Step 2: Soaking the tea stems in water at 70° C., performing through cleaning, performing drying in the air, and grinding to obtain tea powder with a mesh size of 10-20 meshes;

Step 3: Mixing the waste tea residues, the tea powder, the straw powder, the tea pectin cellulose, the coffee residues, the compatibilizer, and the lubricant at 140° C. for 20 min;

Step 4: Lowering the temperature to 55° C., further adding the colorant, the antioxidant and the stabilizer, performing uniform mixing, and performing hydro-molding at 80° C. to obtain the tea-based composite board.

The tea-based composite board of Embodiment 1 is tested, with the testing result of a compressive strength being 418 MPa, a bacteriostatic time being over 10 hours, a folding resistance being up to 1985 times, and strong moisture absorption ability.

Embodiment 2

The embodiment provides a method for preparing a tea-based composite board, wherein the method comprises the steps of:

Step 1: Weighing the raw materials in the following proportions: 40 parts of waste tea residues, 35 parts of tea stems, 20 parts of straw powder, 20 parts of tea pectin cellulose, 30 parts of coffee residues, 3 parts of a compatibilizer, 1 part of a lubricant, 3 parts of a colorant, 3 parts of an antioxidant, 1 part of stabilizer, and 20 parts of reinforced resin glass fiber powder, wherein the water content of the coffee residues is not higher than 10%;

Step 2: Soaking the tea stems in water at 80° C., performing through cleaning, performing drying in the air, and performing grinding to obtain tea powder with a mesh size of 10-20 meshes;

step 3: mixing the waste tea residues, the tea powder, the straw powder, the tea pectin cellulose, the coffee residues, the reinforced resin glass fiber powder, the compatibilizer, and the lubricant at 140 DEG C for 25 minutes;

Step 4: Lowering the temperature to 50° C., further adding the colorant, the antioxidant and the stabilizer, performing uniform mixing, and performing hydro-molding at 80° C. to obtain the tea-based composite board.

The tea-based composite board of Embodiment 1 is tested, with the testing result of a compressive strength being 429 MPa, a bacteriostatic time being 8.5 hours, a folding resistance being up to 1922 times, and strong moisture absorption ability.

Embodiment 3

The embodiment provides a method for preparing a tea-based composite board, wherein the method comprises the steps of:

Step 1: Weighing the raw materials in the following proportions: 30 parts of waste tea residues, 50 parts of tea stems, 15 parts of straw powder, 30 parts of tea pectin cellulose, 30 parts of coffee residues, 4 parts of a compatibilizer, 1 part of a lubricant, 1 part of a colorant, 2 parts of an antioxidant, 2 parts of stabilizer, and 35 parts of industrial wood powder, wherein the water content of the coffee residues is not higher than 10%;

Step 2: Soaking the tea stems in water at 70° C., performing through cleaning, performing drying in the air, and grinding to obtain tea powder with a mesh size of 10-20 meshes;

Step 3: Mixing the waste tea residues, the tea powder, the straw powder, the tea pectin cellulose, the coffee residues, the industrial wood powder, the compatibilizer, and the lubricant at 120° C. for 30 minutes;

Step 4: Lowering the temperature to 55° C., further adding the colorant, the antioxidant and the stabilizer, performing uniform mixing, and performing hydro-molding at 80° C. to obtain the tea-based composite board.

The tea-based composite board of Embodiment 1 has been tested and found to possess a compressive strength being 408 MPa, a bacteriostatic time of greater than 10 hours, a folding resistance up to 1943 times, and strong moisture absorption capabilities.

Embodiment 4

The embodiment provides a method for preparing a tea-based composite board, wherein the method comprises the steps of:

Step 1: Weighing the raw materials in the following proportions: 30 parts of waste tea residues, 40 parts of tea stems, 30 parts of straw powder, 10 parts of tea pectin cellulose, 40 parts of coffee residues, 5 parts of a compatibilizer, 0.5 part of a lubricant, 3 parts of a colorant, 3 parts of an antioxidant, 0.5 part of stabilizer, 20 parts of industrial wood powder, and 20 parts of reinforced resin glass fiber powder, wherein the water content of the coffee residues is not higher than 10%;

Step 2: Soaking the tea stems in water at 70° C., performing through cleaning, performing drying in the air, and grinding to obtain tea powder with a mesh size of 10-20 meshes;

Step 3: Mixing the waste tea residues, the tea powder, the straw powder, the tea pectin cellulose, the coffee residues, the reinforced resin glass fiber powder, the industrial wood powder, the compatibilizer, and the lubricant at 140° C. for 20 minutes;

Step 4: Lowering the temperature to 55° C., further adding the colorant, the antioxidant and the stabilizer, performing uniform mixing, and performing hydro-molding at 80° C. to obtain the tea-based composite board.

The tea-based composite board of Embodiment 1 has been tested and found to possess a compressive strength being 421 MPa, a bacteriostatic time of greater than 10 hours, a folding resistance up to 1962 times, and strong moisture absorption capabilities.

The tea-based composite board thus prepared can be utilized as a substitute for the high-grade woods currently available in the market for any furniture products.

The above embodiments are merely illustrative of several implementations of the invention, and the description thereof is more specific and detailed. However, these embodiments may not be construed as a limitation to the patentable scope of the invention. It should be pointed out that several variations and improvements may be made by those of ordinary skill in the art without departing from the conception of the invention, but such variations and improvements should fall within the protection scope of the invention. Therefore, the scope of protection of the invention patent should be subjected to the appended claims.

What is claimed is:

1. A method for preparing a tea-based composite board, comprising steps of:
    Step 1: weighing raw material components in the following proportions: 60-70 parts of waste tea residues, 20-50 parts of tea stems, 12-30 parts of straw powder, 10-30 parts of tea pectin cellulose, 30-40 parts of coffee residues, 2-5 parts of a compatibilizer, 0.2-1.5 parts of a lubricant, 2-3 parts of a colorant, 0.1-3 parts of an antioxidant, and 0.1-3 parts of a stabilizer;
    Step 2: soaking the tea stems in water at 60-80° C., performing through cleaning, drying in the air, and grinding to obtain tea powder with a mesh size of 10-20 meshes;
    Step 3: mixing the waste tea residues, the tea powder, the straw powder, the tea pectin cellulose, the coffee residues, the compatibilizer, and the lubricant at 120-150° C. for 20-30 min;
    Step 4: lowering the temperature to 50-60° C., further adding the colorant, the antioxidant and the stabilizer, performing uniform mixing, and performing hydro-molding at 50-118° C. to obtain the tea-based composite board.

2. The method for preparing a tea-based composite board of claim 1, wherein the raw material components are replaced by: 40-50 parts of waste tea residues, 20-50 parts of tea stems, 12-30 parts of straw powder, 10-30 parts of tea pectin cellulose, 30-40 parts of coffee residues, 2-5 parts of a compatibilizer, 0.2-1.5 parts of a lubricant, 2-3 parts of a colorant, 0.1-3 parts of an antioxidant, 0.1-3 parts of a stabilizer, and 15-30 parts of reinforced resin glass fiber powder.

3. The method for preparing a tea-based composite board of claim 2, further comprising a step of mixing of the waste tea residues, the tea powder, the straw powder, the tea pectin cellulose, the coffee residues, the reinforced resin glass fiber powder, the compatibilizer, and the lubricant at 120-150° C. for 20-30 minutes, when the raw materials comprise the reinforced resin glass fiber powder.

4. The method for preparing a tea-based composite board of claim 1, wherein the raw material components are replaced by: 30-40 parts of waste tea residues, 20-50 parts of tea stems, 12-30 parts of straw powder, 10-30 parts of tea pectin cellulose, 30-40 parts of coffee residues, 2-5 parts of a compatibilizer, 0.2-1.5 parts of a lubricant, 2-3 parts of a colorant, 0.1-3 parts of an antioxidant, 0.1-3 parts of a stabilizer, and 30-40 parts of industrial wood powder.

5. The method for preparing a tea-based composite board of claim 4, further comprising a step of mixing of the waste tea residues, the tea powder, the straw powder, the tea pectin cellulose, the coffee residues, the reinforced resin glass fiber powder, the compatibilizer, and the lubricant at 120-150° C. for 20-30 minutes, when the raw materials comprise the reinforced resin glass fiber powder.

6. The method for preparing a tea-based composite board of claim 1, wherein the raw material components are replaced by: 30-40 parts of waste tea residues, 20-50 parts of tea stems, 12-30 parts of straw powder, 10-30 parts of tea pectin cellulose, 30-40 parts of coffee residues, 2-5 parts of a compatibilizer, 0.2-1.5 parts of a lubricant, 2-3 parts of a colorant, 0.1-3 parts of an antioxidant, 0.1-3 parts of a stabilizer, 20-30 parts of the industrial wood powder, and 15-20 parts of reinforced resin glass fiber powder.

7. The method for preparing a tea-based composite board of claim 6, further comprising a step of mixing of the waste tea residues, the tea powder, the straw powder, the tea pectin cellulose, the coffee residues, the reinforced resin glass fiber powder, the compatibilizer, and the lubricant at 120-150° C. for 20-30 minutes, when the raw materials comprise the reinforced resin glass fiber powder.

8. The method for preparing a tea-based composite board of claim 1, further comprising a step of preparing tea pectin cellulose that comprises steps of: drying and sterilizing on at least one of the tea stems, tea leaves, and the tea residues, crushing and grinding into powder, cooking at 60-80° C., squeezing; water extracting to obtain the tea pectin cellulose, filtering, and drying.

* * * * *